United States Patent
Reif et al.

[15] 3,682,989
[45] Aug. 8, 1972

[54] PREPARATION OF GRANULAR VITAMIN A ESTERS

[72] Inventors: Werner Reif, Frankenthal; Axel Nuerrenbach, Gruenstadt; Herwig Freyschlag, Ludwigshafen, all of Germany

[73] Assignee: Badische Anilin- & Soda-Fabrik Aktiengesellschaft, Ludwigshafen/Rhine, Germany

[22] Filed: April 24, 1970

[21] Appl. No.: 31,790

[52] U.S. Cl..............260/410, 260/488 A, 260/499, 260/398.5
[51] Int. Cl...........................................C07c 175/00
[58] Field of Search..260/410, 488 A, 704, 707, 499; 424/344

[56] References Cited

UNITED STATES PATENTS

| | | |
|---|---|---|
| 2,790,017 | 4/1957 | Lang et al..................260/674 |
| 2,886,603 | 5/1959 | Shelton.......................260/645 |
| 3,017,668 | 1/1962 | Sundman....................18/47.2 |

*Primary Examiner*—Lewis Gotts
*Assistant Examiner*—Diana G. Rivers
*Attorney*—Johnston, Root, O'Keeffe, Keil, Thompson & Shurtleff

[57] ABSTRACT

Process for the preparation of granular vitamin A esters by contacting the molten vitamin A esters with a cold organic liquid kept in motion.

10 Claims, No Drawings

PREPARATION OF GRANULAR VITAMIN A ESTERS

This invention relates to a process for preparing granular vitamin A esters which are easy to handle and substantially stable to mechanical stresses and chemical action.

Vitamin A esters, which are the most important vitamin A derivatives (particularly vitamin A acetate and vitamin A palmitate), are usually marketed as formulations with organic solvents, such as vegetable oils, since the consistency of the pure substances makes it very difficult to process them into a form which is substantially free from foreign matter, easy to handle, and mechanically and chemically stable.

It is an object of this invention to provide a process for the preparation of a form of vitamin A esters which does not have the drawbacks of prior art formulations.

This object is achieved and granules of vitamin A esters having excellent properties are obtained by introducing a melt of the vitamin A ester into a moving organic liquid cooled to from $-10°$ to $-70°$ C in which the vitamin A ester is insoluble at room temperature and which has a lower density than the vitamin A ester, separating the resultant granules from the liquid and drying them.

Vitamin A esters suitable for the process according to this invention are those of monocarboxylic acids having from 2 to 18 carbon atoms, particularly the acetate and palmitate.

Suitable organic liquids are those whose density is lower than that of the vitamin A esters. The difference in density should be at least 0.02 $g/cm^3$, preferably at least 0.1 $g/cm^3$. Examples of suitable liquids are lower aliphatic alcohols having from 1 to 4 carbon atoms and gasolines having a boiling range of from 150° to 180° C.

Alcohols such as methanol, ethanol, isopropanol and n-butanol and mixtures of these alcohols are particularly suitable as liquids for use in accordance with this invention. Methanol is preferred.

The process may be carried out for example by allowing the vitamin A ester heated to a few degrees, preferably 3° to 10° C, above its melting point to drip or slowly flow through a tube into the cold liquid, which has a temperature of from $-10°$ to $-70°$ C, preferably $-25°$ to $-50°$C. The outlet of the tube may be situated beneath the surface of the liquid; in this case the depth of immersion has to correlated to the temperature of the vitamin A ester melt and the temperature of the cold liquid.

In order to ensure that the melt is always contacted with cold liquid, the liquid must be kept in motion. Thus the process may be carried out by introducing the melt into a tube through which the cold liquid is passed. It is also possible to achieve the desired effect by stirring, provided the melt is added slowly.

The granules are advantageously dried in an inert-gas atmosphere, e.g., under nitrogen or argon.

The granules prepared in accordance with this invention have a mean particle size of from 2 to 8 mm.

If the process is to be carried out continuously, the granules formed may for example be discharged from the liquid by means of a strainer belt and then treated as usual. It is advantageous to carry out not only the drying operation but also all other operations in the absence of oxygen, e.g., under an atmosphere of inert gas such as nitrogen or argon.

The granules obtained by the process according to this invention are spherical or of a flat oval shape, have a crystalline structure and exhibit unexpectedly high resistance to pressure and abrasion so that they can be poured without being damaged and, in particular be provided in this form with protective coatings of, for example, gelatin or polyvinylpyrrolidone. It should also be pointed out that the granules are free from occlusions of the liquid into which the melt has been introduced.

Moreover, the new process makes it possible to increase the oxidation resistance of the vitamin A esters by adding to the melt 0.1 to 5 percent of a conventional stabilizer, e.g., di-tert-butyl cresol and tert-butyl-hydroxyanisole. In the form stabilized in this way the vitamin A esters are much more stable than in the comparable prior art formulations.

The invention will be further illustrated by the following Examples.

EXAMPLE 1

A melt of vitamin A acetate is dripped from a dropping funnel having an outlet 1 mm in diameter and heated at +65°C into methanol at −45°C. The methanol vessel is filled to a height of 400 mm and the distance between the outlet of the funnel and the methanol surface is 5 mm. The drops of vitamin A acetate crystallize completely while sinking to the bottom of the vessel. The granules formed are separated from the methanol, for example by suction filtration, and then dried in a stream of nitrogen. The granules are spherical in shape and have a diameter of about 3 to 4 mm.

Granules having the same properties are obtained when using ethanol, isopropanol or kerosine (boiling range 155° to 185°C) instead of methanol

EXAMPLE 2

A melt of vitamin A palmitate is dripped from a dropping funnel having an outlet 2.5 mm in diameter and heated at 50°C into methanol at −60°C. The methanol vessel is filled to a height of 400 mm and the distance between the outlet of the funnel and the surface of the methanol is 10 mm.

The vitamin A palmitate solidifies into granules of flat oval shape having a diameter of about 5 to 6 mm. The granules are separated from the methanol and dried at −15°C in a current of nitrogen.

EXAMPLE 3

A melt of vitamin A acetate is dripped from a dropping funnel having an outlet 1 mm in diameter and heated at +65°C into methanol at −40°C at a rate of 60 drops per minute. A belt conveyor having a length of 600 mm is immersed in the methanol to the extent of two thirds of its length. At the point where the melt is dripped into the methanol the distance between the belt and the surface of the methanol is 280 mm. The solidified and crystallized drops of vitamin A acetate are discharged by means of the belt conveyor and pre-dried with nitrogen. On leaving the belt the granular material still contains 10 percent by weight of methanol, but it does not stick together. It is then completely freed from methanol in a current of nitrogen. The granules obtained are spherules having a weight of about 30 to 40 mg.

We claim:

1. A process for preparing granular vitamin A esters comprising introducing molten vitamin A ester into a chilled liquid organic solvent in which the vitamin A ester is insoluble at room temperature, said solvent having a temperature of −10° to −70°C, said solvent having a density at least 0.02 g/cm³ lower than the density of said vitamin A ester said solvent being kept in motion to always ensure contact between the melt and the chilled liquid solvent to form therein granules of said vitamin A ester, separating the resulting granules from the solvent and drying them.

2. A process for preparing granular vitamin A esters of aliphatic carboxylic acids having two to 18 carbon atoms, comprising introducing the molten vitamin A ester having a temperature which is 3° to 10°C higher than its melting point, into a stirred or flowing chilled organic solvent being a member selected from the group consisting of lower aliphatic alcohols having one to four carbon atoms, mixtures thereof and gasolines boiling at a temperature of from 150° to 180°C, in which the vitamin A ester is insoluble at room temperature, at a temperature of from −25 and −50°C, said solvent having a lower density than the vitamin A ester, the difference in density being 0.02 g/cm³ or more, separating the resulting granules from the solvent and drying them, said process being carried out in an inert-gas atmosphere.

3. A process for preparing granular vitamin A esters of aliphatic carboxylic acids having two to 18 carbon atoms comprising introducing the molten vitamin A ester having a temperature which is 3° to 10°C higher, than its melting point into a stirred or flowing chilled organic solvent being member selected from the group consisting of lower aliphatic alcohols having one to four carbon atoms, mixtures thereof and gasolines boiling at a temperature of from 150° to 180°C, in which the vitamin A ester is insoluble at room temperature, at a temperature of from −25° to −50°C, said solvent having a lower density than the vitamin A ester, the difference in density being 0.1 g/cm³ or more, separating the resulting granules from the solvent and drying them, said process being carried out in an inert-gas atmosphere.

4. A process for preparing granular vitamin A esters of aliphatic carboxylic acids having two to 18 carbon atoms, comprising introducing the molten vitamin A ester having a temperature which is 3° to 10°C higher than its melting point, into a stirred or flowing, chilled organic solvent being a member selected from the group consisting of methanol, ethanol, isopropanol, n-butanol, mixtures thereof and gasolines boiling at a temperature of from 150° to 180°C, in which the vitamin A ester is insoluble at room temperature, at a temperature of from −25° and −50°C, said solvent having a lower density than the vitamin A ester, the difference in density being 0.1 g/cm³ or more, separating the resulting granules from the solvent and drying them, said process being carried out in an inert-gas atmosphere.

5. A process for preparing granular vitamin A esters of aliphatic carboxylic acids having two to 18 carbon atoms comprising introducing the molten vitamin A ester having a temperature which is 3° to 10°C higher than its melting point, into a stirred or flowing chilled organic solvent being a member selected from the group consisting of lower aliphatic alcohols having one to four carbon atoms, mixtures thereof and gasolines boiling at a temperature of from 150° to 180°C, in which the vitamin A ester is insoluble at room temperature, at a temperature of from −25° and −50°C, said solvent having a lower density then the vitamin A ester, the difference in density being 0.1 g/cm³ or more, the molten ester being introduced directly beneath the surface of the solvent, separating the resulting granules from the solvent and drying them, said process being carried out in an inert gas atmosphere.

6. A process for preparing granular vitamin A esters of aliphatic carboxylic acids having two to 18 carbon atoms comprising introducing the molten vitamin A ester containing 0.1 to 5 percent of an anti-oxidant and having a temperature which is 3° to 10°C higher than its melting point, into a stirred or flowing chilled organic solvent being a member selected from the group consisting of lower aliphatic alcohols having one to four carbon atoms, mixtures thereof and gasolines boiling at a temperature of from 150° to 180°C, in which the vitamin A ester is insoluble at room temperature, at a temperature of from −25 and −50°C, said solvent having a lower density than the vitamin A ester, the difference in density being 0.1 g/cm³ or more, separating the resulting granules from the solvent and drying them, said process being performed in an inert-gas atmosphere.

7. A process for preparing granular vitamin A esters of aliphatic carboxylic acids having two to 18 carbon atoms, comprising introducing the molten vitamin A ester having a temperature which is 3° to 10°C higher than its melting point, into a stirred or flowing chilled organic solvent being a member selected from the group consisting of lower aliphatic alcohols having one to four carbon atoms, mixtures thereof and gasolines boiling at a temperature of from 150° to 180°C, in which the vitamin A ester is insoluble at room temperature, at a temperature of from −25° and −50°C, said solvent having a lower density than the vitamin A ester, the difference in density being 0.02 g/cm³ or more, separating the resulting granules from the solvent and drying them, said granules having diameters of 2 to 8 mm.

8. A process for preparing granular vitamin A esters of aliphatic carboxylic acids having two to 18 carbon atoms comprising introducing the molten vitamin A ester having a temperature which is 3° to 10°C higher than its melting point, into a stirred of flowing chilled organic solvent being a member selected from the group consisting of lower aliphatic alcohols having one to four carbon atoms, mixtures thereof and gasolines boiling at a temperature of from 150° to 180°C, in which the vitamin A ester is insoluble at room temperature, at a temperature of from −25° and −50°C, said solvent having a lower density than the vitamin A ester, the difference in density being 0.02 g/cm³ or more, separating the resulting granules from the solvent by a continuous method and drying them, said process being carried out in an inert-gas atmosphere.

9. A process for preparing granular vitamin A acetate comprising introducing the molten vitamin A acetate into stirred or flowing chilled methanol at a temperature of from −25° and −50°C, separating the resulting granules from the solvent and drying them, said process being carried out in an inert-gas atmosphere.

10. A process for preparing granular vitamin A palmitate comprising introducing the molten vitamin A palmitate into stirred or flowing chilled methanol at a temperature of from −25° and −50°C, separating the resulting granules from the solvent and drying them, said process being carrying out in an inert-gas atmosphere.

* * * * *